United States Patent [19]
Sung et al.

[11] Patent Number: 6,074,495
[45] Date of Patent: Jun. 13, 2000

[54] METHOD FOR ENHANCING THE CORROSION RESISTANCE OF CHEMICAL CONVERSION COATING ALUMINUM

[75] Inventors: Yuh Sung; Chin-Lung Chang, both of Taoyuan, Taiwan

[73] Assignee: Chung Shan Institute of Science & Technology, Taoyuan, Taiwan

[21] Appl. No.: 09/158,141

[22] Filed: Sep. 22, 1998

[51] Int. Cl.$^7$ .................................................. C23C 22/00
[52] U.S. Cl. .......................... 148/251; 148/265; 148/275; 106/14.16
[58] Field of Search ..................................... 148/251, 265, 148/275, 273; 106/14.16

[56] References Cited

U.S. PATENT DOCUMENTS

| | | |
|---|---|---|
| 3,679,564 | 7/1972 | Dowbenko et al. ..................... 204/181 |
| 4,451,304 | 5/1984 | Batiuk . |
| 4,614,607 | 9/1986 | Loch . |
| 4,988,762 | 1/1991 | Overbeek et al. ....................... 524/839 |
| 5,308,709 | 5/1994 | Ogino et al. ............................ 428/623 |
| 5,547,710 | 8/1996 | Satgurunathan et al. ............... 427/386 |

*Primary Examiner*—Prince Willis
*Assistant Examiner*—Andrew L. Ohmans
*Attorney, Agent, or Firm*—Bacon & Thomas

[57] ABSTRACT

A method for treating aluminum to enhance corrosion resistance of its surface. The chemical conversion coating aluminum and aluminum alloys are exposed to an aqueous PU solution to form a PU film on the surface. The aqueous PU solution comprises: (i) 5–15% weight of water dispersable polyurethane resin, (ii) 0.1–56 weight of cross-linking agent, and (iii) 80–94.9% weight of water.

8 Claims, No Drawings

METHOD FOR ENHANCING THE CORROSION RESISTANCE OF CHEMICAL CONVERSION COATING ALUMINUM

FIELD OF THE INVENTION

The present invention relates to a method for treating chemical conversion coating aluminum and aluminum alloy to enhance corrosion resistance of its surface.

BACKGROUND OF THE INVENTION

Chemical conversion coating aluminum has been used by airframe and other manufactures, including the military, to improve aluminum's corrosion resistance and paint adhesion properties.

The aluminum alloy with chromate conversion coatings such as AA2014, AA2024 and AA7075, etc., that are generally used on military and aerospace equipment must comply with the regulation of MIL-C-5541 and MIL-C-81706, in which the corrosion resistance test of ASTM B117, salt spray test is applied. The specified corrosion resistance cannot be less than 168 salt spray hours.

There have been many patents and reports on how to get the chemical conversion coating aluminum to easily pass military regulation. But, how to decrease the concentration of chromate solution without affecting the corrosion resistance of the chemical conversion coating aluminum has not been reported yet.

The U.S. Pat. No. 4,451,304 of Bateuk claims a method for treating deoxidized aluminum prior to conversion coating which improves the ability of the aluminum to pass rigid corrosion resistance requirements. The method uses either a chromic or non-chromic deoxidizer to get rid of aluminum alloy oxide film. The preferred deoxidizer used in this process is hydrofluoric acid or a salt that contains fluorine ion. The chemical conversion coating solution used is Alodine 1200S (manufactured by Amchem Products, Inc.) that consists of mainly fluoride. Although the method does not use a chromate compound as the deoxidizer, the contents of chromate on the chemical conversion solution used is not decreased.

U.S. Pat. No. 4,614,607 of Loch claims a new composition of deoxidizer that can meet the military standard regulation on the corrosion resistance of aluminum alloy without using ammonium nitrite. The main components of the composition are ammonium nitrate, ammonium bifluoride(AMB), sulfuric acid, and nitric acid. The above composition can process metal by soaking. Silica can also be added to obtain a sticky form of deoxidizer, to be used on partial process of specimens that are not suitable for complete soakage. However, the patent does not report anything regarding the decrease of chromate content of the chemical conversion solution.

SUMMARY OF THE INVENTION

The purpose of the present invention is to provide an improved method for treating aluminum metal to enhance corrosion resistance, and especially to meet with salt spray test requirements imposed by the US military.

One other purpose of the present invention is to provide an improved method to decrease the content of chromate used in the chemical conversion coating solution and without lowering the corrosion resistance of the chemical conversion coating aluminum.

The method of the present invention is used to improve the corrosion resistance of aluminum alloy with chromate conversion coatings. The aluminum alloy with a surface that contains chromate conversion coating is processed with an aqueous PU (polyurethane) solution to form a thin PU coating on the chromate conversion coating. The aqueous PU solution comprises: (i) 5–15% weight of water dispersable polyurethane resin, (ii) 0.1–5% weight of cross-linking agent and (iii) 80–94.9% weight of water.

The method a the present invention can strengthen the corrosion resistance of highly intensive and heat processed type of aluminum alloy used in aerospace equipment and weapon systems. For example, the method of the present invention can strengthen the corrosion resistance of 2,000 or 7,000 series aluminum alloy to reach the standard set by the US military. The method of the present invention can strengthen the corrosion resistance of the chemical conversion coating aluminum and decrease the content of chromate used in the chemical conversion coating solution. The present invention can also decrease the usage of chromate compound in chemical conversion solution to 30% of general usage. The decrease in the usage of chromate compound can lower the pollution impact on the environment created by the surface finishing process of aluminum alloy.

The method of the present invention is to reinforce the usually known corrosion resistance of aluminum alloy chromate conversion coating. After the aluminum was coated with chromate salt, a step to soak in the special aqueous PU processing solution is added to complete the strengthening of the salt spray resistant ability of chromate coated aluminum. Although the aqueous PU resin used will form an extremely thin protective coating on the surface of the aluminum alloy, it will not affect the adhesion of paint and the electric contact resistance of the surface as long as the concentration of the aqueous PU solution is controlled appropriately.

The present invention has the following merits:
1. It can enhance the corrosion resistance of chemical conversion coated aluminum.
2. It uses only a few organic volatile solvents, thus will not pollute the environment.
3. The stability of the chemical conversion coated aluminum under an environment of rising temperatures can be increased.
4. The compatibility of corrosion prevention coating and corrosion prevention primer paint provided in the present invention is quite good, thus, this can be used as an intermediate coating between the painting system and the metal surface. Therefore, the adhesion of paint can be advanced.
5. The present invention can lower the usage of chromate (such as $K_2Cr_2O_7$) in the chemical conversion solution. Thus, the pollution impact of the aluminum alloy chemical conversion process on the environment can be decreased.

DESCRIPTION OF PREFERRED EMBODIMENTS

The present invention provides a method for treating aluminum to enhance corrosion resistance of its surface based mainly on colloidal aqueous urethane (such as aqueous water dispersable polyurethane resin). Because aqueous PU can form a delicate and dense thin coating on the chromate coating through a cross-linking agent, the originally incomplete chromate coating defect can be hidden. With the content of corrosion inhibitor, the corrosion resistance of the chromate coated aluminum is strengthened.

According to the method of the present invention, the water dispersable polyurethane resin used can be an isocyanate copolymer of either aromatic, aliphatic or alicyclic. It also contains some corrosion inhibitor, such as a soluble or insoluble salt of zinc, strontium, sodium or potassium, like tungstate, molybdate, vanadate, and chromate, etc.

The polyurethane resin used in the present invention includes all types of isocyanate prepolymers such as: 2,4-toluene diisocyanate, 2,6-toluene diisocyanaate, 1.4-cyclohexane diisocyanate, dicyclohexylmethane, 4,4'-diisocyanate and xylene diisocyanate, etc. Aromatic diisocyanate is not a good isocyanate prepolymer, because it easily becomes yellow when exposed to ultraviolet light. Aliphatic or alicyclic diisocyanate usually has excellent resistance to the yellowing effect caused by ultraviolet light. Therefore, the diisocyanate used in the present invention should be Aliphatic or alicyclic diisocyanate to better resist yellowing.

The polyurethane used in the present invention is a good stable liquid suspended form of urea, urea-urethane high molecular compound salt, that is composed of the monomer described in previous paragraphs. This type of dispersed solution can be diluted by water. The high molecular compound salt used in the present invention is urethane prepolymer that contains isocyanate and is composed of carboxyl group and tertiary polyamide. This type of prepolymer is a reaction product of polyisocyanate and polyol with an acid value of about 5–18 C, and is an ion of non-neutrality. This type of polyisocyanate must be neutralized by using primary, secondary, or tertiary amine after compounding to form a stable liquid colloidal suspension. The best amine neutralizing solution used is the one that can keep the pH value of the suspension between 8 and 9, and must have a high boiling point so the pH value will not be lowered due to large scale volatilization, and the gelatinizing of the polyurethane suspension can be prevented.

According to a preferred embodiment of the present invention, the protective coating that strengthen the corrosion resistance of chemical conversion coating aluminum also needs an effective cross-linking agent that has reasonable stability on the added electrolyte, such as a corrosion inhibitor, etc. Thus, the adding of a corrosion inhibitor will not invalidate the effect of the cross-linking agent. Moreover, as the tolerable temperature of chromate conversion coating cannot exceed 66° C., the maturing temperature of the cross-linking agent used cannot be too high. The best cross-linking agent used is the one that matures under room temperature. Therefore, arizidine cross-linking agent would be the better choice. Arizidine cross-linking agent is a tri-functional group carboxyl reaction type of cross-linking agent. Adding arizidine in an aqueous resin dispersed solution that contains carboxyl group can strengthen the ability of chemical, water, and corrosion resistance of the dry film coating. At the same time, the functional group of arizidine has pH sensitivity. When in the presence of a high pH value, its tri-cyclo ring can exist stably in an aqueous PU dispersable solution. When pH value falls, arizidine starts an open-ring reaction. The open-ring reaction of arizidine can be processed under normal temperature, and is especially applicable to the non-heat resisting chromate conversion coating.

Arizidine cross-linking agent has been widely used in industry. The present invention uses arizidine as a cross-linking agent of aqueous PU. When work is taken out from the aqueous PU solution and put under the atmosphere, the counter-cation such as triethylamine, diethylamine, or other applicable amine inside the aqueous PU eventually volatize, lowering the pH value of aqueous PU attached on the work. At this moment, arizidine reacts with the carboxyl group in aqueous PU, and forms cross-linking. Thus, the characteristics of chemical and corrosion resistant, etc. of the PU coating is improved. Moreover, the aqueous PU in the process tank absorbs carbon dioxide in the atmosphere, bringing down the pH value of the aqueous PU dispersal solution. Therefore, the process tank must be covered when it is not in use to reduce the contact of aqueous PU with air, and must be inspected periodically and supplemented with organic amine to maintain the pH value of aqueous PU between 8–9, and prevent the tank solution from gelatinizing.

In the improved method of the present invention, the content of the aqueous PU coating may contain various kinds of corrosion inhibitor, which may be either water soluble or insoluble. Metallic salts of the Group V-B and VI-B of the periodic table are the preferred corrosion inhibitors. The applicable corrosion inhibitors for the present invention are chromate such as zinc chromate, potassium chromate, potassium dichromate, sodium chromate, sodium dichromate, calcium chromate, calcium dichromate, ammonium chromate, and ammonium dichromate, etc.

Nevertheless, alkaline metal or alkaline earth metal compound of molybdate, tungstate, and vanadate, such as sodium tungstate, sodium molybdate, sodium vanadate, etc., are also applicable to be used in aqueous PU resin as aluminum alloy corrosion inhibitors. To lower the usage of chromate, although the effect of inhibiting corrosion of chromate is better, the use of chromate is avoided.

The aqueous PU resin used in the present invention can be obtained in the market, through companies such as Tai-Chang Resin Industrial Co., in Taiwan, R.O.C., Polyvinyl Chemicals Co., in Massachusetts, USA, or Spencer Kellogg Co., in the state of New York, USA.

The aliphatic aqueous PU used in the present invention is R-960 of Polyvinyl Chemicals Co. and TCU-6331 or TCU-9635 of Tai-Chang Resin Industrial Co. and aromatic aqueous PU resin is Spensol L-44 of Spencer Kellogg Co.

From the present invention, it is understood that other components may be added to satisfy the special demand of thin coating such as paint, dyestuff, and pigment, etc.

The present invention not only can strengthen the corrosion resistance of chemical conversion coated aluminum and aluminum alloys, but also lower the usage of chromate at the same time without decreasing the corrosion resistance. The many operational parameters involved have a complex relationship with the characteristic of PU coating, and can be roughly summarized as follows:

After the conventional surface finishing of the chromate coating, soak in the aforesaid PU processing solution for 1 to 5 hours to get different salt spray resisting effects with corrosion resistance that relates positively to the soaking time. The solutes of the PU aqueous solution can be adjusted according to requirements. If low electric contact resistance is required, use dilute aqueous solution. The solutes content in the PU solution relates oppositely to the electric contact resistance. When the solution contains less PU, the PU coating formed is thinner, thus, is more favorable in a place that needs high electric conduction. If higher corrosion resistance is required, increase the solutes content in the PU solution, as corrosion resistance relates positively to the solutes content in the PU solution.

For PU to form a complete thin coating on chromate conversion coating easier, there is no need to clean up with water when soaking in the formulated aqueous solution disclosed in the present invention. It only needs to be situated under the atmosphere for 3–5 hours, depending on the weather condition before spread painting. For PU to be completely matured, 3 to 7 days will be needed.

The present invention can be better understood with the following embodiments, but the range of the present invention is not limited to the illustrated examples.

Examples of the formula of aqueous PU processing solution used in present invention:

| Formula A | |
|---|---|
| Aliphatic or aromatic aqueous PU | 10% (W/V) |
| diethylamine | 1% (W/V) |
| DI water | 89% (W/V) |
| Formula B | |
| Aliphatic or aromatic aqueous PU | 12% (W/V) |
| arizidine | 2% (W/V) |
| triethanolamine | 1% (W/V) |
| DI water | 85% (W/V) |
| Formula C | |
| Aliphatic or aromatic aqueous PU | 10% (W/V) |
| triethylamine | 1% (W/V) |
| sodium tungstate | 1% (W/V) |
| DI water | 88% (W/V) |
| Formula D | |
| Aliphatic or aromatic aqueous PU | 10% (W/V) |
| arizidine | 2% (W/V) |
| sodium molybdate | 1% (W/V) |
| triethanolamine | 1% (W/V) |
| DI water | 86% (W/V) |

COMPARATIVE EXAMPLE 1
Chemical Convention Coating Process

Use trichloroethylene to degrease AA2014-T6 aluminum alloy trial work, then sit to dry. Clean and degreasing for about 20–30 minutes. The cleanser used to clean and degrease must be corrosion free cleanser with pH between 11–13, active alkalinity between 15 to 20% (Weight percentage) and processing temperature of 40–60° C. Then use tap water to soak and wash for 60–90 seconds. After cleaning, begin deoxidizing process in room temperature for 2 to 6 minutes. The main contents of the solutions used to deoxidize are: 300–500 ml/l of 66° Bé sulfuric acid, 300–500 ml/l of nitric acid, 20–30 g/l of ammonium bifluoride and 5–10 g/l of ammonium nitrate. Afterwards clean aluminum alloy work with ambient water for about two minutes, soak in 3 g/l concentration of Irridite 14-2 chromate solution for 3–6 minutes to proceed the reaction. After cleaning with water, put the work in the atmosphere for 24 hours for the chromate conversion coating film to stabilize. Thus, the surface finishing of chromate conversion coating on aluminum alloy is completed. The result of its 5% neutral salt spray test is illustrated in Table 1.

EXAMPLE 1
Improving the Corrosion Resistance of the Chemical Conversion Coating Aluminum Take the same aluminum alloy trial work AA2014-T6, repeat the surface finishing of chromate conversion coating on aluminum alloy in Comparison Example 1 to obtain the same aluminum alloy with chromate conversion coating as Comparison Example 1. Soak the aluminum alloy with chromate conversion coating completed in the above in Formula A solution for 5 hours. Then take it out and put under the atmosphere to dry for 3–5 hours. The result of its salt spray test is illustrated in Table 1.

EXAMPLE 2

Repeat the steps in Application Example 1, replace Formula A solution with Formula D solution. The result of its salt spray test is illustrated in Table 1.

EXAMPLE 3

Repeat the steps in Application Example 2, but prolong the soaking time in Formula D solution from 5 hours to 10 hours. The result of its salt spray test is illustrated in Table 1.

EXAMPLE 4

Repeat the steps in Application Example 3, but replace the AA7075-T6 aluminum alloy work with AA2014-T6 aluminum alloy work. The result of its salt spray test is illustrated in Table 1.

TABLE 1

Results of Salt Spray Test

| Testing Material | Formula and soaking Time (Hour) | Result of Salt Spray Test (Hour) | Qualification Disposition |
|---|---|---|---|
| Comparison Example 1 | 0 hour | <168 | Not qualified |
| Example 1 | Formula A, 5 hours | >168 | Qualified |
| Example 2 | Formula D, 5 hours | >168 | Qualified |
| Example 3 | Formula D, 10 hours | >336 | Qualified |
| Example 4 | Formula D, 10 hours | >336 | Qualified |

The results in Table 1 show that when the concentration of Irridite 14-2 chromate solution used in chromate process is lowered to 3 g/l as in Comparison Example 1, the result of its salt spray test is unqualified. When the same Irridite 14-2 chromate solution used in the chromate process is lowered to 3 g/l but with the improved method of the present invention such as Application Example 1 and 4, the results of their salt spray tests are both qualified. Therefore, it is certain that the improved method of the present invention can lower the usage of chromate in the chemical solution used in the surface finishing of chromate conversion coating without lowering the corrosion resistance of the finished surface.

From the foregoing descriptions, one skilled in the art can easily ascertain the essential characteristics of this invention, and without departing from the spirit and scope thereof, can make various changes and modifications of the invention to adapt it to various usages and conditions. Thus, other embodiments are also within the claims.

What is claimed is:

1. A method for treating aluminum to enhance corrosion resistance of its surface, which comprises:

a) coating the aluminum surface with chromate;

b) exposing the chromate coated aluminum surface to an aqueous polyurethane solution, said aqueous polyurethane solution comprising: (i) 5–15% weight of a water dispersible polyurethane resin, (ii) 0.1–5% weight of a cross-linking agent which is arizidine, and (iii) 80–94.9% weight of water; and wherein the polyurethane solution contains diethylamine, triethylamine or triethanolamine;

c) forming a polyurethane film on the chromate conversion coated aluminum surface.

2. The method of claim 1, wherein said aqueous polyurethane solution further comprises: (iv) 0.1–5% weight of corrosion inhibitor.

3. The method of claim 2, wherein the corrosion inhibitor is selected from the group consisting of tungstate, molybdate, vanadate, or chromate of zinc, strontium, sodium, and potassium.

4. The method of claim 1, wherein the water dispersible polyurethane resin is selected from the group consisting of aromatic, aliphatic, and alicyclic isocyanate copolymers.

5. The method of claim 1, wherein the aqueous polyurethane containing solution has a pH of between 8 and 9.

6. The method of claim 1, wherein crosslinking takes place at room temperature.

7. A method for treating aluminum to enhance corrosion resistance of its surface, which comprises:

a) coating the aluminum surface with chromate;

b) exposing the chromate coated aluminum surface to an aqueous polyurethane solution, said aqueous polyurethane solution comprising: (i) 5–15% weight of a water dispersible polyurethane resin, (ii) 0.1–5% weight of a cross-linking agent which is arizidine, and (iii) 80–94.9% weight of water;

c) forming a polyurethane film on the chromate conversion coated aluminum surface wherein the crosslinking takes place at room temperature.

8. The method of claim 7, wherein said aqueous polyurethane solution further comprises: (iv) 0.1–5% weight of corrosion inhibitor.

* * * * *